United States Patent Office.

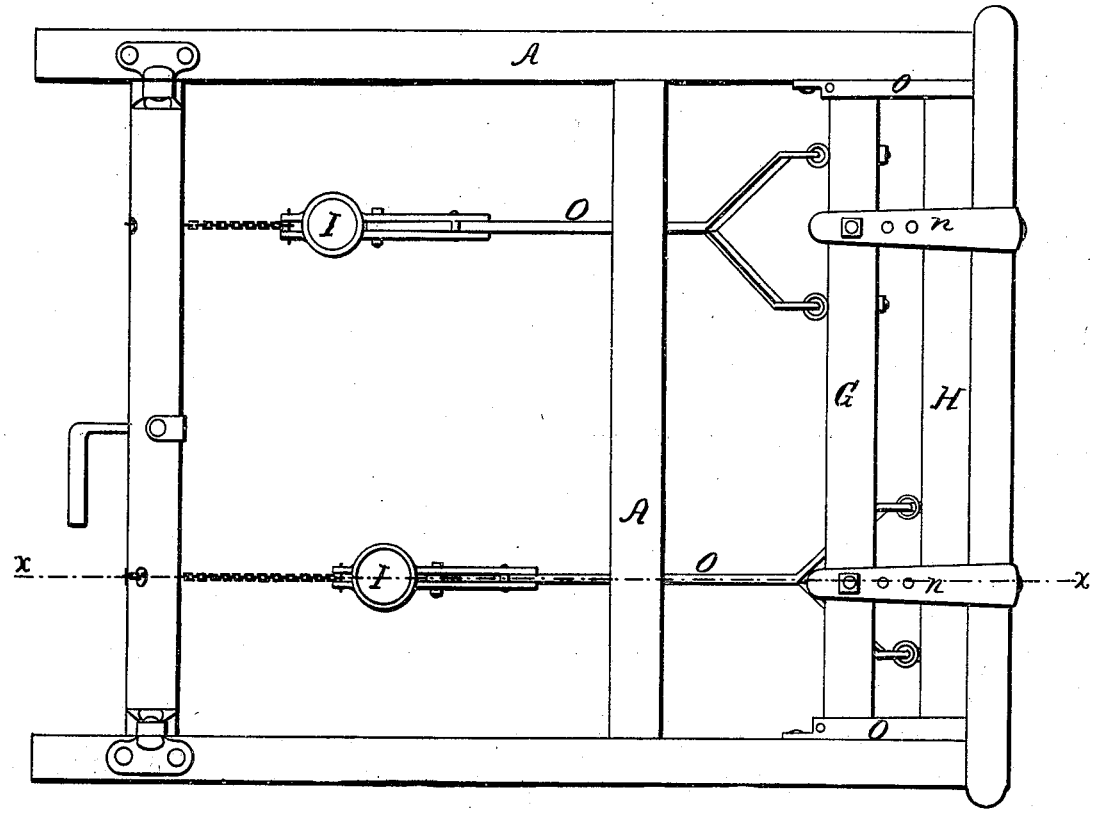

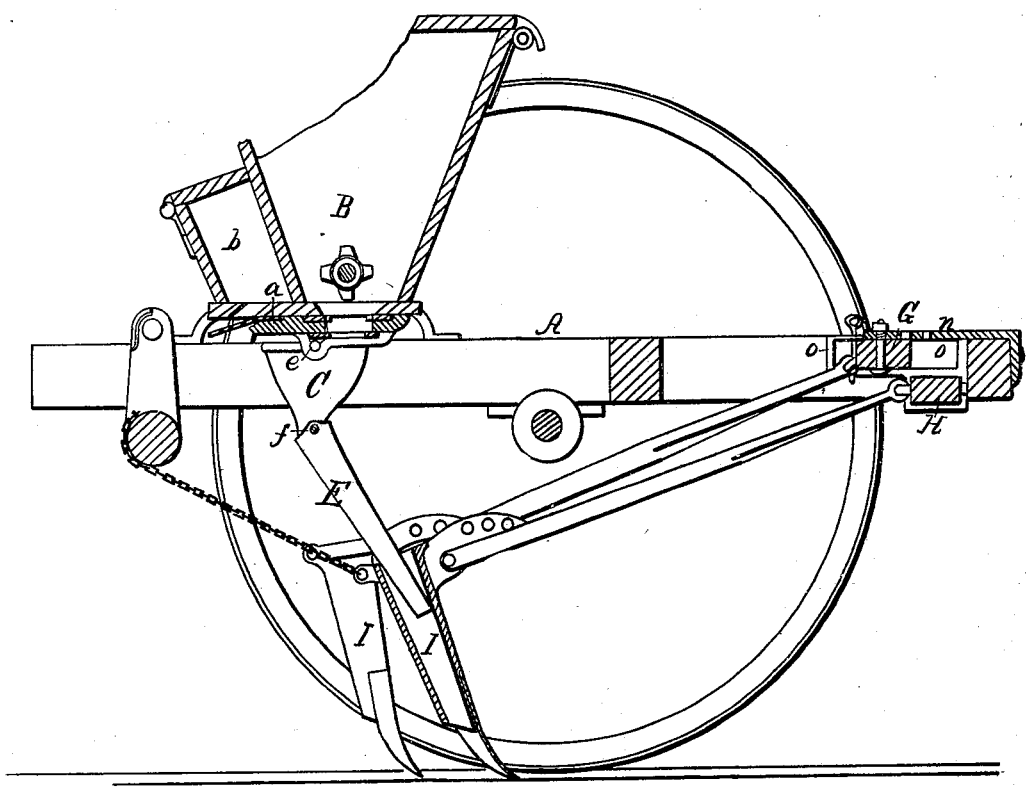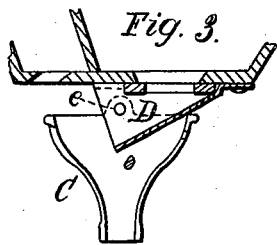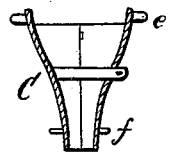

JOHN H. THOMAS, PHINEAS P. MAST, AND CHARLES O. GARDINER, OF SPRINGFIELD, OHIO, ASSIGNORS TO JOHN H. THOMAS AND PHINEAS P. MAST.

Letters Patent No. 93,370, dated August 3, 1869.

---

IMPROVEMENT IN GRAIN-DRILLS.

---

The Schedule referred to in these Letters Patent and making part of the same.

---

Be it known that we, JOHN H. THOMAS, PHINEAS P. MAST, and CHARLES O. GARDINER, of Springfield, Clark county, Ohio, have made certain new and useful Improvements in Grain-Drills; and we hereby declare that the following is a clear, full, and exact description thereof, reference being had to the accompanying drawings, making part of this specification, and to the letters of reference marked thereon, like letters indicating like parts wherever they occur on the drawings.

Our invention relates to certain improvements in grain-drills; and

It consists—

First, in a novel manner of arranging the drill-teeth, so that they may be shifted from one to two rows, or vice versa;

Second, in hinging or pivoting metallic conductors to the hopper-bottom;

Third, in hinging the conductors to spouts, and so arranging them that their open end is exposed, to show whether or not the grain is flowing; and Fourth, pivoting the tube to the conductors, all as hereinafter explained.

Figure 1 is a longitudinal vertical section on the line x-x of fig. 2;

Figure 2 is a top plan view, with the hopper removed; and

Figure 3 is a vertical section of a portion detached.

In this machine, we make use of the ordinary frame A and hopper B, mounted on two wheels in the usual manner.

In this case, we attach one-half of the drag-bars O—each alternate one of the series—to a fixed bar, H, secured at the front end of the frame, as shown in figs. 1 and 2, the other half of the series of bars being attached to a movable bar, G, the ends of which are held in grooves in metal plates o, secured at the inner sides of the frame, at the front, as shown in figs. 1 and 2.

This movable bar G is held in any desired position by means of pins, or bolts inserted through holes in the plates o, or through holes in metal arms, or bars n, secured firmly to the front end of the frame, as shown in fig. 2.

By this arrangement, one-half of the drag-bars and their drill-teeth always retain a fixed position, while the other half, attached to the bar G, can be shifted forward or back, as desired.

When this bar G is shoved forward, so as to be directly over the bar H, then the drill-teeth I are brought into one regular row, crosswise of the machine; but when this bar G is shoved back, then the teeth attached thereto are also thrown back, thus forming them into two rows, as represented in figs. 1 and 2, that is, if the drag-bars are of uniform length; but, if the two sets of drag-bars are made of unequal lengths, then the longer set will be attached to the lower and fixed bar H, in which case they will be thrown into one row by shoving the upper bar G back, and into two rows by shoving it forward.

In this drill, we use the metal conductor C, described in our specification previously filed; but as in this machine we do not use the feed-roller and cup therein described, instead of pivoting the conductor C, as in that case, we pivot or hinge it directly to the bottom a of the hopper, as shown in fig. 1, or to a spout, D, secured to the hopper-bottom, as represented in fig. 3.

By this arrangement, the conductors C and the tubes attached to them more readily adapt themselves to the positions assumed by the drill-teeth I, as the latter are shifted forward or back.

In order to render the conductors C and their tubes E still more pliable or yielding, we pivot the tubes E to the lower end of the conductors C, as shown at f, fig. 1.

This may be done by forming holes, and inserting eyelets in the opposite sides of the tube E, at the top, and then inserting a pin through these holes and through corresponding holes in the lower end of the conductor C.

But we prefer, as simpler, cheaper, and better, the plan of casting the conductor C with small journals projecting from the opposite sides, at the lower end, as shown in fig. 4, and then hinging the tube E upon them.

By using the spouts D, and hinging the conductors to them, the latter are thrown so far back as to bring a portion of their upper open end back of and from under the hopper, so that the driver is at all times able, by looking into it, to ascertain whether or not the grain is flowing. And this is highly important, for the reason, that sometimes the passages become clogged, and the grain ceases to flow for a considerable time before being detected, and, consequently, a portion of the field, more or less in extent, remains unsown, and the fact is not known until the grain comes up, when it is too late to resow the ground.

This plan of shifting the drill-teeth from one to two rows, and vice versa, is extremely simple, and is intended to be done when the machine is first started, they being arranged in one or two rows, according to the condition of the ground, whether having much or little weeds and trash on it. If much, they will be arranged in two rows; but if the ground be clean, then in one row.

It is obvious that a lever may be arranged to move the loose bar and its teeth, if desired.

Having thus described our invention,

What we claim as new, and of our invention, is—

1. The fixed bar H and the sliding bar G, each having a portion of the drag-bars attached thereto, and all arranged to operate substantially as and for the purpose described.

2. The conductor C, constructed substantially as described, and pivoted to the under side of the hopper, or to a stationary spout, D, secured to the under side of the hopper, substantially as herein set forth.

3. The plates $n$, secured to the front part of the frame, and arranged to secure the sliding bar G, with its drill-teeth, in place, substantially as set forth.

JOHN H. THOMAS.
PHINEAS P. MAST.
CHARLES O. GARDINER.

Witnesses:
H. S. SHOWERS,
J. W. THOMAS.